United States Patent [19]

Shigemoto

[11] Patent Number: 4,731,400

[45] Date of Patent: Mar. 15, 1988

[54] THERMOPLASTIC RESIN COMPOSITION

[75] Inventor: Hiromi Shigemoto, Iwakuni, Japan

[73] Assignee: Mitsui Petrochemical Industries, Ltd., Tokyo, Japan

[21] Appl. No.: 808,952

[22] Filed: Dec. 16, 1985

[30] Foreign Application Priority Data

Dec. 18, 1984 [JP] Japan ................... 59-265443

[51] Int. Cl.$^4$ .............. C08K 5/34; C08K 5/48; C08L 23/18
[52] U.S. Cl. ................. 524/88; 524/89; 524/90; 524/204; 524/443; 524/579
[58] Field of Search ............ 524/88, 90, 204, 443, 524/579, 89

[56] References Cited

U.S. PATENT DOCUMENTS 3,692,712 9/1972 Crouch et al. ............... 525/191
4,452,846 6/1984 Akao ............................ 428/328
4,525,469 6/1985 Veda et al. .................... 526/142
4,571,416 2/1986 Jarzombek et al. ........... 524/579

OTHER PUBLICATIONS

Derwent Abs. 95606/D52 TokyoInk, 11-13-81 J56145926.
Derwent Abs. 44304c/25 Dainichi Nippon Cables, J55062935 (5-12-1980).
Derwent Abs. 79871B/44 Dainichi Nippon Cables, J54122347 (9-21-79).

Primary Examiner—Herbert J. Lilling
Attorney, Agent, or Firm—Sherman and Shalloway

[57] ABSTRACT

A thermoplastic resin composition having excellent transparency and a high ultraviolet transmittance and free from a reddish color is obtained from a polymer or copolymer of 4-methyl-1-pentene and a blue pigment. Preferably, the composition further comprises a black pigment and/or a red pigment.

26 Claims, No Drawings

THERMOPLASTIC RESIN COMPOSITION

This invention relates to a thermoplastic resin composition having excellent transparency and ultraviolet light permeability.

Thermoplastic resins having good transparency such as polystyrene, polymethyl methacrylate, polycarbonate and poly(4-methyl-1-pentene), because of their lighter weight and higher impact strength than glass, have recently found extensive use as a substitute for glass in transparent containers, instruments and appliances used in chemical experiments (e.g., beakers and measuring cylinders), injection syringes, optical cells, and windowpanes. Above all poly(4-methyl-1-pentene) has good heat resistance and permeability to ultraviolet light in addition to its good transparency, and is useful as a material for optical cells. Although poly(4-methyl-1-pentene) and other thermoplastic resins having excellent transparency have almost the same ultraviolet light transmittance as ordinary glass, i.e. soda glass, they have the defect of possessing a much lower ultraviolet light transmittance than quartz glass. Furthermore, poly(4-methyl-1-pentene) is obtained by polymerization in the presence of a Ziegler catalyst, and is slightly reddish although having excellent transparency.

It is an object of this invention to provide a poly(4-methyl-1-pentene) composition having excellent transparency and a high ultraviolet light transmittance and being free from a reddish color.

Another object of this invention is to provide a poly(4-methyl-1-pentene) composition having a high ultraviolet transmittance and being free from a reddish color while retaining the excellent properties inherent to poly(4-methyl-1-pentene) such as heat resistance, heat aging resistance and transparency.

Other objects and advantages of this invention will become apparent from the following description.

According to the invention, the above objects and advantages are achieved by a thermoplastic resin composition comprising (A) a homopolymer of 4-methyl-1-pentene or a copolymer of 4-methyl-1-pentene with another alpha-olefin and (B) 1 to 100 ppm of a blue pigment.

The 4-methyl-1-pentene polymer (A) used in this invention may be a crystalline homopolymer of 4-methyl-1-pentene or a crystalline copolymer of it with another alpha-olefin. The other alpha-olefin preferably has 2 to 20 carbon atoms and includes, for example, ethylene, propylene, 1-butene, 1-hexene, 1-octene, 1-decene, 1-tetradecene and 1-octadecene.

The 4-methyl-1-pentene copolymer preferably contains at least 85 mole%, especially at least 90 mole%, of 4-methyl-1-pentene units.

The 4-methyl-1-pentene polymer (A) preferably has a melt flow rate (MFR), measured at a temperature of 260° C. under a load of 5 kg, of 0.5 to 200 g/10 min., especially 5 to 50 g/10 min.

The 4-methyl-1-pentene polymer (A) can be produced by polymerizing 4-methyl-1-pentene with or without the other alpha-olefin in the presence of a Ziegler catalyst comprising a titanium catalyst component and an organoaluminum catalyst component. The polymers so produced are typical examples to which the present invention applies.

The blue pigment (B) used in this invention is incorporated in an amount of 1 to 100 ppm, preferably 5 to 50 ppm, in the thermoplastic resin composition of this invention. The blue pigment may be organic or inorganic, and includes, for example, ultramarine, cobalt blue, cerulean blue, phthalocyanine blue and indanthrene blue. Those having an absorption peak in a wavelength region of 400 to 600 nm, especially 450 to 650 nm, are preferred.

Investigations of the present inventor have shown that the resin composition of this invention may further comprise (C) 0.5 to 15 ppm of a black pigment and/or (D) 0.01 to 5 ppm of a red pigment and thereby shows a better color. Preferably, the black pigment is used in an amount of 1 to 10 ppm, and the red pigment, in an amount of 0.05 to 1 ppm.

Preferably, the resin composition of this invention contains the blue pigment (B), the black pigment (C) and the red pigment (D) in the above-mentioned amounts. It is preferable for the composition of this invention to contain all of the above pigments (B), (C) and (D) in a total amount of 6 to 110 ppm, especially in a total amount of 10 to 50 ppm.

Preferred black pigments include, for example, carbon black, graphite and black iron oxide.

Preferred red pigments include, for example, red organic and inorganic pigments such as red iron oxide, red iron oxide powder, cadmium red, alizarin lake, anthraquinone red, mercury red, permanent red F5R, chromophthal red, isoindolinone red, quinacridone red and pyrazolone red.

Most preferably, the resin composition of this invention contains ultramarine, black iron oxide and quinacridone red as pigments. This composition especially has excellent heat stability, light stability, bleedout resistance, chemical resistance, water resistance, boiling water resistance and hygienic property as well as excellent transparency.

The use of the blue pigment (B), optionally together with the black pigment (C) and/or the red pigment (D), has the effect of emphasizing the transparency of the thermoplastic resin composition of this invention and hiding discoloration that may occur with time.

The thermoplastic resin composition of this invention can be obtained by mixing the 4-methyl-1-pentene polymer (A) and the blue pigment (B) optionally together with the black pigment (C) and/or the red pigment (D) in the proportions described hereinabove by various known methods, for example in a Henschel mixer, a V-blender, a tumbler blender, etc., thereafter melt-kneading the mixture by, for example, a single-screw extruder, a twin-screw extruder, a kneader or a Banbury mixer, and granulating or pulverizing the mixture.

The addition of the pigments to the 4-methyl-1-pentene polymer (A) may be effected, for example, by a so-called dry coloring method comprising treating the pigments with a surface-treating agent, etc. and mixing them directly with the 4-methyl-1-pentene polymer, or a so-called master batch method comprising dispersing the pigments in the same type of polymer in high concentrations, and adding the resulting master batch to the 4-methyl-1-pentene polymer. Since the amounts of the pigments added to the thermoplastic resin composition of this invention are very small, the master batch method is preferred. It is easy by this method to adjust the dispersion non-uniformity of the pigments and the amounts of the pigments added.

Known additives ordinarily used for thermoplastic resins, such as heat stabilizers, weatherability stabilizers, lubricants, antiblocking agents, and nucleating agents, may be incorporated in the thermoplastic resin composition in amounts which do not detract from the objects of this invention.

The thermoplastic resin composition has improved ultraviolet permeability and an excellent color without impairing the inherent transparency of the 4-methyl-1-pentene polymer.

The thermoplastic resin composition of this invention may have a Hunter's L value, a value and b value, measured by the methods to be described hereinbelow, of 50 to 95, −3 to 3, and −15 to 10, respectively, and preferably 60 to 80, −2 to 2 and −10 to 5, respectively, and a light transmittance, measured in accordance with the method described hereinbelow, of 60 to 99.5%, preferably 80 to 99%. It gives a very beautiful transparency feeling to humans.

Furthermore, since the inherent heat stability, boiling water resistance, chemical resistance and hygienic property of the polymer are not at all deteriorated, the composition of this invention is useful as a material for containers used in contact with foods such as heat-resistant tableware, articles used for medical therapy, instruments used in physical and chemical experiments, electrical and electronic component parts, and optical articles such as discs and fibers.

The following examples illustrate the present invention more specifically. It should be understood that the invention is not limited to these examples unless it departs from the spirit and scope of the invention described and claimed herein.

In the following examples, the master batches and resin compositions contained about 0.25% by weight of tetrakis[methylene-3-(3,5-di-t-butyl-4-hydroxyphenyl)-propionate]methane, about 0.3% by weight of pentaerythritol tetra(lauryl thiopropionate) and about 0.05% by weight of zinc stearate as a heat stabilizer.

EXAMPLE 1

Preparation of a master batch

A 4-methyl-1-pentene/1-decene crystalline copolymer prepared in the presence of a titanium-type Ziegler catalyst and having a 4-methyl-1-pentene content of 95.8 mole% and an MFR, measured in accordance with ASTM D 1238 at a temperature of 260° C. and under a load of 5 Kg, of 26 g/10 min. was mixed individually with 0.5% by weight of ultramarine, 0.1% by weight of black iron oxide and 0.01% by weight of quinacridone red, and then melt-kneaded in an extruder having a screw diameter of 65 mm (molding temperature 260° C.) to produce an ultramarine master batch (MB-I), a black iron oxide master batch (MB-II) and a quinacridone red master batch (MB-III).

Preparation of a thermoplastic resin composition

To the same copolymer as above were added 0.4% by weight of MB-I, 0.5% by weight of MB-II and 0.1% by weight of MB-III, and they were mixed by a Henschel mixer. The mixture was melt-kneaded and granulated in an extruder having a screw diameter of 65 mm (molding temperature 260° C.) to give a granular poly(4-methyl-1-pentene) composition (PMP-I).

The PMP-I was molded by an injection molding machine (M100, Meiki Co. LTD., Japan) under conditions including cylinder temperatures of $C_1$: 280° C., $C_2$: 290° C., and $C_3$: 300° C., a nozzle temperature of 300° C., and a cylinder volume of 190 cc to produce rectangular plates having a size of 120×120×2 mm. The inside of the die used at this time was mirror-surface polished (the degree of polishing was ▽▽▽▽).

The following properties of the injection-molded rectangular plates were evaluated. The results are shown in Table 1.

1. Optical properties
   (1) Gloss: Measured in accordance with ASTM D 523
   (2) Light transmittance: measured in accordance with ASTM D 1003
   (3) Haze: Measured in accordance with ASTM D 1003-61 Procedure A
   (4) Color: Measured as follows:

A measuring sample obtained by stacking 10 injection-molded rectangular plates having a thickness of 2 mm (prepared as above) was used, and the L, a, and b values of the sample were determined by a Hunter color and color difference meter (Model ND-100DP, made by Nippon Denshoku Kogyo Co., Ltd.). The Hunter's L, a and b values were calculated in accordance with JIS Z8722-1982 4.4 and JIS Z8730-1980 6.3.2.

According to JIS Z8730-1080 6.3.2 the color difference according to Hunter's color difference formula is calculated by the following formula:

$$\Delta E_H = [(\Delta L)^2 + (\Delta a)^2 + (\Delta b)^2]^{\frac{1}{2}} \tag{II}$$

where
$\Delta E_H$ = color difference;
$\Delta L$, $\Delta a$ and $\Delta b$ = color difference on the lightness index L, and chromaticity index a, b, respectively, for colors of two surface colors, calculated by the formulas shown below based on tristimulas values, X, Y and Z.

$$L = 10\, Y^{\frac{1}{2}} \tag{12}$$

$$\left. \begin{array}{l} a = 17.5\,(1.02\,X - Y)/Y^{\frac{1}{2}} \\ b = 7.0\,(Y - 0.847\,Z)/Y^{\frac{1}{2}} \end{array} \right\} \tag{13}$$

where,
L = light index according to Hunter's color difference formula;
a, b = chromaticity index according to Hunter's color difference formula;
X, Y, Z = tristimulas index according to W, Y, X system, as provided in JIS Z8722 using the standard light C.

The tristimulas values X, Y and Z are calculated by the formula (3)′:

$$\left. \begin{array}{l} X = K \cdot \sum_{380}^{780} S(\lambda)\bar{x}(\lambda)\tau(\lambda) \\ Y = K \cdot \sum_{380}^{780} S(\lambda)\bar{y}(\lambda)\tau(\lambda) \\ Z = K \cdot \sum_{380}^{780} S(\lambda)\bar{z}(\lambda)\tau(\lambda) \end{array} \right\} \tag{3}'$$

where $$K = \frac{100}{\sum_{380}^{780} S(\lambda)\bar{y}(\lambda)};$$

$S(\lambda)$ = value at wavelength of spectral distribution of standard light $\bar{x}(\lambda) =$ } values of color matching
$\bar{y}(\lambda) =$ } function in $X$, $Y$, $X$ chromatic
$\bar{z}(\lambda) =$ } system $\tau(\lambda) =$ spectral transmitting factor of the transmitting object, measured by using air layer without the specimen inserted in the optical path as the standard object.

2. Ultraviolet transmittance

Measured by a two-wavelength self-recording spectrophotometer.

3. Heat aging resistance

The sample was left to stand in a Geer's oven of the hot air circulating type heated at 150° C., and the time which elapsed until cracks occur was measured.

4. Boiling water test

The sample was immersed in boiling water. It was taken out after a predetermined period of time, and its outside appearance was visually evaluated.

5. Steam resistance

The sample was placed in an autoclave for pressurized steam sterilization and left to stand at 121° C. Four hours later, it was taken out, and its outside appearance was visually evaluated.

COMPARATIVE EXAMPLE 1

The copolymer used in Example 1 was injection-molded without adding the pigment master batches. The properties of the rectangular plate sample were evaluated as in Example 1. The results are shown in Table 1.

EXAMPLE 2

Ultramarine, black iron oxide and quinacridone master batches having the same pigment concentrations as in Example 1 were prepared in the same way as in Example 1 except that a 4-methyl-1-pentene/hexadecene/octadecene crystalline copolymer having an MFR of 26 g/10 min. (4-methyl-1-pentene content 89 mole%) was used instead of the copolymer used in Example 1. A thermoplastic resin composition having the same pigment concentrations as in Example 1 was prepared as in Example 1 (PMP-II). The properties of the PMP-II were evaluated in the same way as in Example 1. The results are shown in Table 1.

COMPARATIVE EXAMPLE 2

Comparative Example 1 was repeated except that the copolymer used in Example 2 was used instead of the copolymer used in Comparative Example 1.

EXAMPLE 3

A resin composition (PMP-III) was prepared in the same way as in Example 1 except that only master batch MB-I was added in the same amount to the copolymer. The properties of PMP-III were evaluated in the same way as in Example 1. The results are shown in Table 1.

TABLE 1

| Test Item<br>Sample designation | Example 1<br>PMP-I | Comparative<br>Example 1<br>— | Example 2<br>PMP-II | Comparative<br>Example 2<br>— | Example 3<br>PMP-III |
|---|---|---|---|---|---|
| Haze (%) | 1.9 | 1.1 | 1.9 | 1.1 | 1.9 |
| Gloss (%) | 117 | 120 | 118 | 119 | 120 |
| Light transmittance (%) | 92 | 93 | 91 | 93 | 93 |
| L value | 75 | 70 | 73 | 75 | 65 |
| a value | −1 | 0.5 | −2 | 0.1 | 0 |
| b value | 2 | 14 | 4 | 16 | −5 |
| Ultraviolet light transmittance (330 nm, %) | 73 | 66 | 78 | 72 | 72 |
| Ultraviolet light transmittance (320 nm, %) | 66 | 57 | 73 | 63 | 67 |
| Heat aging resistance (160° C.) | Cracked 60 days later | Cracked 60 days later | Cracked 60 days later | Cracked 60 days later | Cracked 60 days later |
| Boiling water resistance (1 week later) | No change | No change | No change | No change | No change |
| Steam resistance (4 weeks later) | No change | No change | No change | No change | No change |

What is claimed is:

1. A thermoplastic resin composition consisting essentially of
    (A) a crystalline homopolymer of 4-methyl-1-pentene or a crystalline copolymer of 4-methyl-1-pentene and another alpha-olefin, and
    (B) 1 to 100 ppm of a blue pigment.

2. The composition of claim 1 which has a Hunter's L value, a value and b value of 50 to 95, −3 to 3 and −15 to 10, respectively.

3. A thermoplastic resin composition consisting essentially of
    (A) a crystalline homopolymer of 4-methyl-1-pentene or a crystalline copolymer of 4-methyl-1-pentene and another alpha-olefin,
    (B) 1 to 100 ppm of a blue pigment, and
    (C) an effective amount of at least one additive selected from the group consisting of a heat stabilizer, a weatherability stabilizer, a lubricant, an antiblocking agent and a nucleating agent.

4. A thermoplastic resin composition consisting essentially of
    (A) a crystalline homopolymer of 4-methyl-1-pentene or a crystalline copolymer of 4-methyl-1-pentene and another alpha-olefin,
    (B) 1 to 100 ppm of a blue pigment, and at least one of the components (C) and (D):
    (C) 0.5 to 15 ppm of a black pigment, and
    (D) 0.01 to 5 ppm of a red pigment.

5. The composition of claim 4 which has a Hunter's L value, a value and b value of 50 to 95, −3 to 3 and −15 to 10, respectively.

6. A thermoplastic resin composition consisting essentially of (A) a crystalline homopolymer of 4-methyl-1-pentene or a crystalline copolymer of 4-methyl-1-pentene and another alpha-olefin, (B) 1 to 100 ppm of a blue pigment, and at least one of the components (C) and (D):

(C) 0.5 to 15 ppm of a black pigment, (D) 0.01 to 5 ppm of a red pigment, and (E) an effective amount of at least one additive selected from the group consisting of a heat stabilizer, a weatherability stabilizer, a lubricant, an antiblocking agent and a nucleating agent.

7. The composition of claim 6 which has a Hunter's L value, a value and b value of 50 to 95, −3 to 3 and −15 to 10, respectively.

8. A thermoplastic resin composition consisting essentially of (A) a crystalline homopolymer of 4-methyl-1-pentene or a copolymer of 4-methyl-1-pentene and another alpha-olefin and (B) a blue pigment and having a Hunter's L value, a value and b value of 50 to 95, −3 to 3 and −15 to 10, respectively.

9. The composition of claim 8 which has a light transmittance of 60 to 99.5%.

10. A thermoplastic resin composition consisting essentially of (A) a crystalline homopolymer of 4-methyl-1-pentene or a copolymer of 4-methyl-1-pentene and another alpha-olefin, (B) a blue pigment, and (C) an effective amount of at least one additive selected from the group consisting of a heat stabilizer, a weatherability stabilizer, a lubricant, an antiblocking agent and a nucleating agent and having a Hunter's L value, a value and b value of 50 to 95, −3 to 3 and −15 to 10, respectively.

11. The composition of claim 1, containing from 5 to 50 ppm of the blue pigment.

12. The composition of claim 3 containing from 5 to 50 ppm of the blue pigment.

13. The composition of claim 4 containing from 5 to 50 ppm of the blue pigment and at least one of the components (C) and (D):

(C) 1 to 10 ppm of black pigment, (D) 0.05 to 1 ppm of red pigment.

14. The composition of claim 13 containing both (C) and (D).

15. The composition of claim 14 wherein (B) the blue pigment is ultramarine, (C) the black pigment is black iron oxide, and (D) the red pigment is quinacridone red.

16. The composition of claim 8 having Hunter's L value, a value and b value of 60 to 80, −2 to 2 and −10 to 5, respectively.

17. The composition of claim 16 having a light transmittance of 80 to 99%.

18. A clear, light transparent molded article of poly(4-methyl-1-pentene) having high ultraviolet transmittance and being free of a reddish color, said molded article being formed from a moldable composition consisting essentially of (A) a crystalline homopolymer of 4-methyl-1-pentene or a crystalline copolymer of at least 85 mole percent 4-methyl-1-pentene with another alpha-olefin having from 2 to 20 carbon atoms;

(B) 1 to 100 ppm of a blue pigment;

(C) up to 15 ppm of a black pigment;

(D) up to 5 ppm of a red pigment; and (E) an effective amount of at least one additive selected from the group consisting of heat stabilizers, weatherability stabilizers, lubricants, antiblocking agents and nucleating agents.

19. The clear, transparent molded article of claim 18 having Hunter's L, a and b values of 60 to 80, −2 to 2 and −10 to 5, respectively, and a light transmittance of 80 to 99%.

20. The clear, transparent molded article of claim 19 containing at least one of the black pigment (C) and the red pigment (D) in amounts of 0.5 to 15 ppm and 0.01 to 5 ppm, respectively.

21. A light transparent thermoplastic resin composition comprising (A) a crystalline homopolymer of 4-methyl-1-pentene or a crystalline copolymer of 4-methyl-1-pentene and another alpha-olefin, and (B) 1 to 100 ppm of a blue pigment, and (C) having a light transmittance of 60 to 99.5% and (D) being substantially free from an olefin oligomer of α-olefin having 8 to 12 carbon atoms.

22. The composition of claim 21 which further comprises (C) 0.5 to 15 ppm of a black pigment, and/or (D) 0.01 to 5 ppm of a red pigment.

23. The composition of claim 21 or 22 which has a Hunter's L value, a value and b value of 50 to 95, −3 to 3, and −15 to 10, respectively.

24. The composition of claim 21 which further comprises an additive effective amount of at least one additive selected from the group consisting of a heat stabilizer, a weatherability stabilizer, a lubricant, an antiblocking agent and a nucleating agent.

25. A light transparent thermoplastic resin composition (1) comprising (A) a crystalline homopolymer of 4-methyl-1-pentene or a copolymer of 4-methyl-1-pentene and another alpha-olefin and (B) a blue pigment, (2) having (C) a Hunter's L value, a value and b value of 50 to 95, −3 to 3, −15 to 10, respectively and (D) a light transmittance of 60 to 99.5%, and (3) being substantially free from an olefin oligomer of α-olefin having 8 to 12 carbon atoms.

26. A clear, light transparent molded article of poly(4-methyl-1-pentene) having high ultraviolet transmittance and being free of a reddish color, said molded article being formed from a moldable composition consisting essentially of (A) a crystalline homopolymer of 4-methyl-1-pentene or a crystalline copolymer of at least 85 mole percent 4-methyl-1-pentene with another alpha-olefin having from 2 to 20 carbon atoms;

(B) a blue pigment, and (C) an effective amount of at least one of additives selected from the group consisting of heat stabilizers, weatherability stabilizers, lubricants, antiblocking agents and nucleating agents, and having a Hunter's L value, a value and b value of 50 to 95, −3 to 3 and −15 to 10, respectively.

* * * * *